(12) United States Patent
Schofl et al.

(10) Patent No.: US 8,555,375 B2
(45) Date of Patent: Oct. 8, 2013

(54) CONFIGURATION METHOD FOR CONTROL UNITS

(75) Inventors: Martin Schofl, Tiefenbach (DE); Christian Fondel, Oberwcsel (DE); Robert Laux, Neuwied (DE)

(73) Assignee: Bomag GmbH, Boppard (DE)

( * ) Notice: Subject to any disclaimer, the term of this patent is extended or adjusted under 35 U.S.C. 154(b) by 1923 days.

(21) Appl. No.: 11/446,360

(22) Filed: Jun. 5, 2006

(65) Prior Publication Data

US 2006/0282657 A1 Dec. 14, 2006

(51) Int. Cl.
*H04L 9/32* (2006.01)

(52) U.S. Cl.
USPC ............................................. 726/16; 726/17

(58) Field of Classification Search
USPC ................... 713/1, 100; 726/1–7, 16–21, 34; 701/50
See application file for complete search history.

(56) References Cited

U.S. PATENT DOCUMENTS

| 6,167,337 A * | 12/2000 | Haack et al. .................... 701/50 |
| 6,175,770 B1 | 1/2001 | Bladow |
| 7,209,794 B2 * | 4/2007 | Duppong ........................ 700/86 |
| 2003/0086387 A1 * | 5/2003 | Matsui et al. ................. 370/324 |
| 2004/0221146 A1 * | 11/2004 | Baumann .......................... 713/1 |
| 2005/0283295 A1 * | 12/2005 | Normann ........................ 701/50 |
| 2007/0191057 A1 * | 8/2007 | Kamada ........................ 455/558 |

FOREIGN PATENT DOCUMENTS

| DE | 19510247 A1 | 10/1996 |
| EP | 0434986 A2 | 7/1991 |
| EP | 1071019 A2 | 1/2001 |
| EP | 1089147 A2 | 4/2001 |
| EP | 1233315 A1 | 8/2002 |

* cited by examiner

*Primary Examiner* — Hosuk Song
(74) *Attorney, Agent, or Firm* — Baker & Hostetler LLP

(57) ABSTRACT

The invention relates to a configuration method for a control unit of a machine, the control unit having a data memory and being mounted in a machine control system having at least one already configured control unit with a data memory, the to-be-configured control unit communicating via a data connection with the already configured control unit of the machine control system and retrieving therefrom configuration data for its own configuration.

23 Claims, 2 Drawing Sheets

CONFIGURATION METHOD FOR CONTROL UNITS

CROSS-REFERENCE TO RELATED APPLICATIONS

This application claims priority to German Patent Application No. 102005025645.7, filed Jun. 3, 2005, all of the disclosure of which is hereby incorporated by reference in its entirety.

FIELD OF THE INVENTION

The invention relates to a configuration method for a control unit of a machine, said control unit having a data memory and being mounted in a machine control system having at least one already configured control unit with a data memory.

BACKGROUND OF THE INVENTION

By such a configuration method, machine-specific data or parameters such as for example pump, valve, mechanical or software characteristics are transmitted as configuration data to the respective control units and stored in ROM, RAM or EEPROM data memories. Such a configuration method can be carried out after initial startup of a control unit for reconfiguration or initial configuration thereof or as a system startup configuration each time a machine control system is started.

On machines with incorporated machine control system, certain parameters of the control system are often specific to the machine and must be set or entered into the electronic components of the machine control system referred to herein as control units in the form of configuration data when the machine is put into operation. In parts, the values of these configuration data differ greatly from one machine to the other, all the more so when the machines are of various types. But even with machines of the same construction, the configuration data of comparable control units may differ greatly. This is due in parts to tolerances of the machine components used such as driving components and also to individual parameters of the machines such as individual utilization time, operating hours, operational performance, option release or personal settings of the users of the machine.

In particular when a control unit had been replaced, it was hereto before often compulsory to re-enter the individual machine parameters in the form of configuration data into the newly mounted control unit of the machine since a new control unit or a replacement control system can only contain standard values. This configuration work requires considerable time and can often only be performed by trained staff. This is all the more true when the control unit is a central control unit such as the central control system of the machine since the machine must then be treated like a new machine and must be completely reconfigured.

SUMMARY OF THE INVENTION

It is therefore the object of the invention to indicate a configuration method for a control unit of a machine that is particularly easy and fast to carry out.

In accordance with the invention, the solution to this object is achieved with a configuration method for a control unit of a machine, said control unit having a data memory and being mounted in a machine control system having at least one already configured control unit with a data memory, the to-be-configured control unit communicating via a data connection with the already configured control unit of the machine control system and retrieving therefrom the configuration data for its own configuration. Preferred developed implementations are indicated in the dependent claims.

In accordance with the invention, the configuration data, which are also referred to as learning values, are not only stored in the control unit of concern itself but also in other electronic components of the machine control system that are capable of storing. If a control unit is replaced, the newly mounted and still to be configured control unit can retrieve all by itself its configuration data from the other control units that remained in the machine control system. As a result, the configuration data need no longer be entered manually. Accordingly, the configuration method of the invention is particularly easy and fast to perform, in particular also in case of reconfigurations. The data connection can be a bus connection, e.g., a CAN-bus.

The configuration data is preferably stored in the data memory of the control unit to be configured. The advantage thereof is that the control unit needs not read in its configuration data from at least one other control unit each time the machine control system is started. As a result, a system startup performed after the data have been stored is even faster and more convenient. The data memory may be a ROM, EEPROM, RAM or similar.

In a particularly preferred embodiment of the method, the to-be-configured control unit carries out a security inquiry prior to retrieving or storing the configuration data. A configuration authentication may be requested and compared with a configuration authentication stored in the data memory of the control unit to be configured. This configuration authentication may for example be a password, a code or a hardware signal. The configuration data obtained from the machine control system will only be retrieved or stored in the data memory of the control unit if the configuration authentication requested is consistent with the saved one. The configuration authentication is entered by a user of the machine using an input means that is connected to the to-be-configured control unit or to the machine control system. Suited input means hereby are keyboards, touch-sensitive screens or the like. The security inquiry itself can be subdivided into a plurality of singular inquiries.

Practically, a plausibility control is performed during the security inquiry, in which the configuration data obtained from the machine control system are compared with plausibility data stored in the control unit to be configured. Accordingly, a check is performed by means of the given values or ranges of values to verify whether the configuration data obtained are consistent with these data or whether they are within an admissible range of values and appear to make sense as a result thereof. The plausibility data can be stored in a truth table in the data memory of the control unit to be configured. In an alternative, the plausibility data may also be integrated in the system software of the control unit itself.

In another preferred embodiment of the configuration method of the invention, the to-be-configured control unit communicates through data connections with the first and at least a second already configured control unit of the machine control system and obtains configuration data from a respective one of these at least two control units. This means that in this case the machine control system has a total of at least three control units with memory that may be connected to one or a plurality of bus systems for example.

It is preferred that the configuration data obtained by the to-be-configured control unit from the at least two already configured control units of the machine control system relate to the same configuration parameters. The then obtained configuration data relate for example to one and the same machine parameter such as the operational performance of the machine for example.

In a particularly advantageous developed implementation of the method, a consistency check is performed during security inquiry in which the configuration data obtained from the already configured control units are compared with each other. This allows for realizing a fully automated configuration of the newly mounted control unit in which a check is always performed before the configuration data are taken over into the to-be-configured control unit to check whether and to which extent the data of the two other control units are consistent. Conclusions may be drawn therefrom with regard to the functioning of the other control units or of the machine control system.

Preferably, configuration data are only stored in the to-be-configured control unit if all of the configuration data respectively obtained are consistent in the configuration parameters of concern. As a result, the configuration data may be efficiently prevented from being transmitted to the to-be-configured control unit if inconsistencies between the configuration data obtained are ascertained. Meaning, as soon as the configuration data are inconsistent, no configuration data will be stored in the to-be-configured control unit. This serves to protect against a configuration with erroneous configuration data.

In an alternative developed implementation, singular configuration data are stored in the to-be-configured control unit if they are consistent with all the other configuration data respectively obtained concerning the same configuration parameter. This means that, as contrasted with the method variant described above, singular configuration data are stored if they are consistent with respect to singular configuration parameters. Put another way, only those data will not be stored that have been found out to be inconsistent.

In another alternative, singular configuration data are stored in the to-be-configured control unit if they are consistent with the majority of the other corresponding configuration data respectively obtained. This means that the way of proceeding with the configuration data obtained is decided by majority. In this respect, other strategies such as weighted majority decisions regarding the further way of proceeding may be envisaged.

Practically, different control units of the machine control system are associated with different hierarchy stages. The configuration data of a control unit of a higher hierarchy stage will receive priority consideration over the configuration data of a control unit of a lower hierarchy stage during consistency check. Master-slave configurations are particularly appropriate in which a central control unit in particular serves as the master. Then, the other subordinate control units, which are slaves, will compulsorily receive their configuration from the master.

It is advantageous if singular configuration data are combined into configuration data sets. Thus, machine-typical configuration data may be combined into groups and processed as a group. In a particularly practical manner, code numbers are assigned to singular configuration data sets. As a result, the data bulk to be compared may be reduced. Configuration is carried out faster.

Preferably, during consistency check, rather than to check all the configuration data, only the code numbers of singular configuration data sets are checked, at least in parts. If singular code numbers are not consistent, the corresponding data sets may then be compared one by one and where necessary configured one by one, either manually or also automatically.

In another developed implementation of the configuration method of the invention, if a security inquiry has not been answered properly, the user of the machine will be requested to manually enter at least singular configuration data.

It is particularly advantageous if the configuration method is carried out automatically after the mounting of a new control unit. As a result, an automatic configuration is carried out each time a control unit is mounted into the existing machine control system. This is particularly convenient and also low in cost since manual configuration, for example by service staff, is only needed if the configuration data are inconsistent. Thus, the control units may also be mounted by the machine operating staff.

It is practical to carry out a configuration authentication, a consistency check and/or a plausibility check of the configuration data of at least some of the control units of the machine control system each time the machine control system is started. It is thus ensured that all the control units will always be configured properly and not only after a new control unit has been mounted. Then the configuration method is preferably performed such that, if not all of the acquired configuration data are identical, they are replaced by such configuration data that are consistent with the majority of the acquired configuration data and/or that originate from a control unit of a higher hierarchy stage.

Preferably, the configuration data contain data related to the type of machine and/or individual data of the singular machine.

In a particularly preferred developed implementation of the configuration method, at least two control units of a different type are used to control the machine so that in at least one of the control units data are stored for a control unit of a type different from its own. In such a case, the to-be-configured control unit receives for example data from a control unit of another construction that performs completely different control functions in the machine control system. Accordingly, data are stored in the already configured control unit, which are not needed for its own function.

Preferably, a control unit operates as a central control unit which is assigned the task of a central control system coordinating all the control units. Then, it is practical if this central control unit has the highest hierarchy stage for the consistency check. Put another way, it then is the master control unit in a master-slave configuration of the machine control system.

The method of the invention finds preferred application in the configuration of control units in building machines such as compressors, road rollers, vibration plates or similar machines, e.g., in mortisers and waste compressors.

BRIEF DESCRIPTION OF THE DRAWINGS

Hereinafter, the configuration method of the invention will be discussed in greater detail with reference to two exemplary embodiments illustrated in the drawing. The drawing schematically shows in FIG. 1 a schematic illustration of a machine control system with two control units.

DETAILED DESCRIPTION OF THE INVENTION

Figure 1:
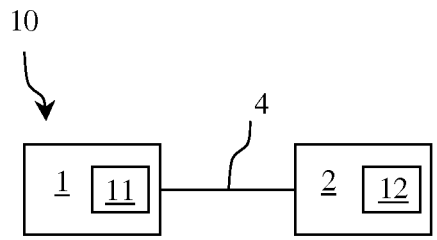

In FIG. 1 there is shown a machine control system 10 for a soil compaction roller with two control units 1 and 2 that are connected together by a CAN-bus 4. Either of the two control units 1 and 2 has an EEPROM data memory 11 and 12. The control unit 1 is mounted into the machine control system 10 and retrieves its configuration data from the already configured control unit 2 after it has been mounted in the machine control system 10. In this exemplary embodiment, the control unit 1 is a central control unit located on a higher hierarchy level. Meaning, control unit 1 is the master and control unit 2 the slave.

Figure 2:
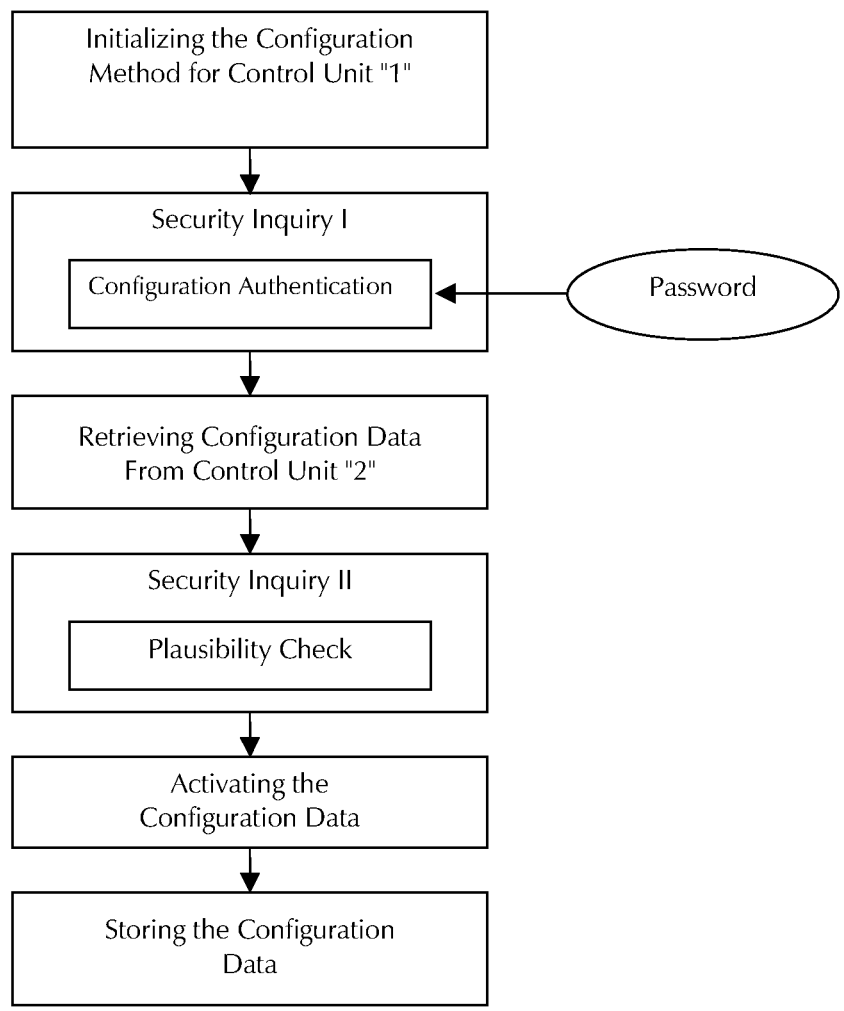
FIG. 2 a flow chart of a first exemplary embodiment of the configuration method with two control units.

If in the machine control system 10 shown in FIG. 1 one of the two control units 1 or 2 is to be replaced because it is defective for example, the configuration of the newly mounted control unit can be carried out semi-automatically in accordance with the invention. FIG. 2 shows how the configuration method of the invention proceeds in case a replaced central control unit 1 has been newly mounted.

At first, the newly mounted control unit 1 has no configuration data yet and starts an initialization program for the configuration as it is started for the first time. In this program, the control unit 1 first requests, in a first part of the security inquiry, a configuration authentication of the user, which is also referred to as release condition. Via a keyboard, the user manually enters its configuration authentication for the control unit 1. If the password has been entered properly, the control unit 1 communicates with the control unit 2 through a data bus and receives its configuration data from the control unit 2. In an alternative, the control unit 1 can also load itself the data from the memory 12 of control unit 2. After reception of the configuration data, the control unit 1 verifies in a second part of the security inquiry, in a plausibility check, whether the configuration data obtained by the control unit 2 are in a usual range of values. This occurs by comparing the received data with a truth table stored in a ROM memory. If the data are plausible, they are automatically stored in the memory 11 of the control unit and the configuration is successfully completed. If the data received by the slave 2 are not in the plausible range, only the plausible configuration data are stored. The other configuration data must be entered manually into the control unit 1 by the operating staff, or must be taken from the ROM-table and stored.

Figure 3:
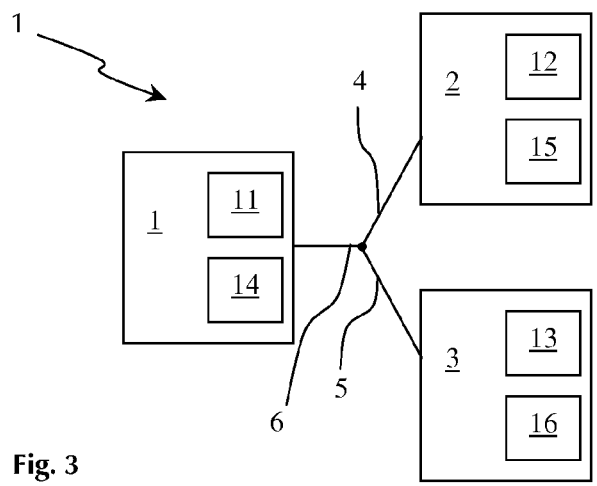
FIG. 3 a schematic illustration of a machine control system with three control units.

FIG. 3 shows a machine control system 10 for a soil compaction roller that has three control units 1, 2, 3. The control units 1, 2, 3 are connected together through three CAN-bus connections 4, 5, 6 and each have one EEPROM data memory 11, 12, 13 in this exemplary embodiment. Additionally, the control units 1, 2, 3 all also have a working memory 14, 15, 16. Like in the first exemplary embodiment shown in FIG. 1, the control unit 1 is the master while the control units 2 and 3 are slaves.

Figure 4:
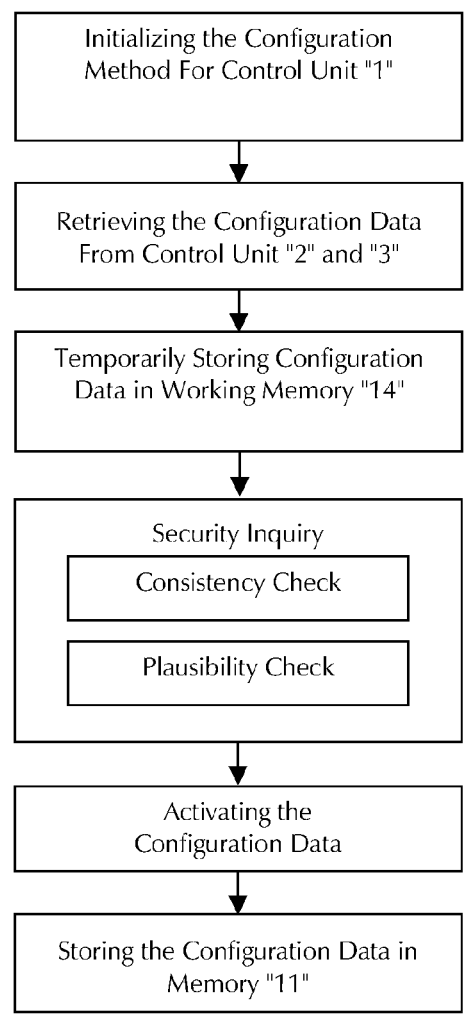
FIG. 4 a flow chart of a second exemplary embodiment of the configuration method with three control units.

If the control unit 1 is mounted into the existing machine control system 10 and is put into operation for the first time, its configuration is performed fully automatically with the assistance of the control units 2 and 3, as shown in the flow chart in FIG. 4. The central control system 1 thereby starts with an initialization program and automatically interrogates its configuration data, which are stored temporarily in the RAM working memory 14, from the two control units 2 and 3 via a bus data connection 4 or 5. Next, the received configuration data are subjected to a consistency check and to a plausibility check in the course of a security inquiry. The consistency check serves to verify whether the data sets obtained from the control units 2 and 3 are consistent and the plausibility check whether the configuration data received from the control units 2, 3 are in the usual range of values. If the configuration data are consistent and plausible, they are activated in the central control system 1 and stored in the EEPROM memory 11 thereof. After that, the configuration data are available for the control unit 1 at each system startup.

In normal operation, meaning if none of the control units needs to be reconfigured, a system start configuration of the control unit 1 occurs. This configuration is performed automatically at each startup of the machine control system, with the central control unit 1 reading out its own configuration data from the EEPROM 11 and the configuration data stored in the memories 11 and 12 of the control units 2 and 3 and loading them into the working memory 14. There, it compares the configuration data in the course of the consistency check. If the values of all three components are the same, the central control unit 1 proceeds with the startup procedure. If however one value of one control unit is not consistent with those of the other ones, its configuration data are replaced by the data of the other control units.

Irrespective of the configuration being a reconfiguration or a system startup configuration, the automatic configuration of the control units 1, 2 or 3 is aborted if no decision can be taken as to which configuration data are valid. This is for example the case if during its reconfiguration the central control unit 1 receives inconsistent configuration data from the two slaves 2 and 3. Then, the already existing values are discarded and manual configuration is enforced.

What is claimed:

1. A configuration method for a control unit of a machine control system, mounted in a construction machine or a waste compressor, that includes a to-be-configured master control unit with a data memory and at least one already-configured slave control unit with a data memory storing configuration data for the master control unit and the slave control unit, the method comprising:
   connecting the to-be-configured master control unit to the already-configured slave control unit using a machine-based CAN-bus; and
   communicating configuration data for the master control unit from the already-configured slave control unit to the to-be-configured master control unit using the machine-based CAN-bus,
   wherein the configuration data are related to a type of machine or to an individual machine, and include at least one of pump characteristics, valve characteristics, mechanical characteristics or learning values, and
   wherein the configuration data for the master control unit and the slave control unit are different.

2. The configuration method as set forth in claim 1, further comprising storing the configuration data for the master control unit in the data memory of the to-be-configured master control unit.

3. The configuration method as set forth in claim 1, wherein the to-be-configured master control unit carries out a security inquiry before the configuration data for the master control unit is communicated.

4. The configuration method as set forth in claim 3, wherein a configuration authentication is requested during the security inquiry, said configuration authentication being compared with a configuration authentication stored in the data memory of the to-be-configured master control unit so that the configuration data obtained from the machine control system are only stored in the data memory of the to-be-configured master control unit if the requested configuration authentication is consistent with the stored configuration authentication.

5. The configuration method as set forth in claim 4, wherein the configuration authentication is entered by a user of the construction machine with the assistance of an input means that is connected to the to-be-configured master control unit or to the construction machine control system.

6. The configuration method as set forth in claim 3, wherein a plausibility check is performed during the security inquiry, in which the configuration data obtained from the already-configured slave control unit are compared with data stored in the to-be-configured master control unit.

7. The configuration method as set forth in claim 3, wherein, if a security inquiry has not been answered properly, manually entering at least singular configuration data.

8. The configuration method as set forth in claim 3, wherein a consistency check is performed during the security inquiry in which the configuration data obtained from the already-configured slave control units are compared with each other in view of configuration parameters.

9. The configuration method as set forth in claim 8, wherein configuration data are only stored in the to-be-configured master control unit if all of the configuration data respectively obtained are consistent in the configuration parameters of concern.

10. The configuration method as set forth in claim 8, wherein singular configuration data are stored in the to-be-configured master control unit if they are consistent with all other respectively obtained configuration data relating to the same configuration parameter.

11. The configuration method as set forth in claim 8, wherein singular configuration data are only stored in the to-be-configured master control unit if they are consistent with a majority of other corresponding configuration data respectively obtained.

12. The configuration method as set forth in claim 8, wherein different control units of the construction machine control system are associated with different hierarchy stages, with the configuration data of a control unit of a higher hierarchy stage receiving priority consideration over the configuration data of a control unit of a lower hierarchy stage during the consistency check.

13. The configuration method as set forth in claim 1, wherein the to-be-configured master control unit communicates through machine-based CAN-bus data connections with the first and at least a second already-configured control unit of the construction machine control system and obtains configuration data from a respective one of the already-configured control units.

14. The configuration method as set forth in claim 13, wherein the configuration data that the to-be-configured master control unit obtains from each already-configured slave control unit include the same type of configuration data.

15. The configuration method as set forth in claim 1, wherein singular configuration data are combined into configuration data sets.

16. The configuration method as set forth in claim 15, wherein code numbers are assigned to singular configuration data sets.

17. The configuration method as set forth in claim 16, wherein, during a consistency check, rather than to check all the configuration data, only the code numbers of singular configuration data sets are checked, at least in parts.

18. The configuration method as set forth in claim 1, wherein the method is automatically carried out after a new control unit has been mounted.

19. The configuration method as set forth in claim 1, wherein a configuration authentication, a consistency check and/or a plausibility check of the configuration data of at least some of the control units of the construction machine control system are carried out each time the machine control system is started.

20. The configuration method as set forth in claim 19, wherein, if not all of the checked configuration data are identical, the configuration data of all the control units are replaced by such configuration data that are consistent with a majority of the checked configuration data and/or that originate from a control unit of a higher hierarchy stage.

21. The configuration method as set forth in claim 1, wherein at least two control units of a different type are used to control the construction machine so that, in at least one of the control units, data are stored for a control unit of a type different from its own.

22. The configuration method as set forth in claim 1, wherein the master control unit is assigned the highest hierarchy stage for a consistency check.

23. The configuration method as set forth in claim 1, wherein the learning values include at least one of an individual utilization time, operating hours, user settings, or operational performance parameters.

* * * * *